April 12, 1932.   W. E. JOHNSON   1,853,059
CELESTIAL GLOBE
Filed June 3, 1931   3 Sheets-Sheet 2
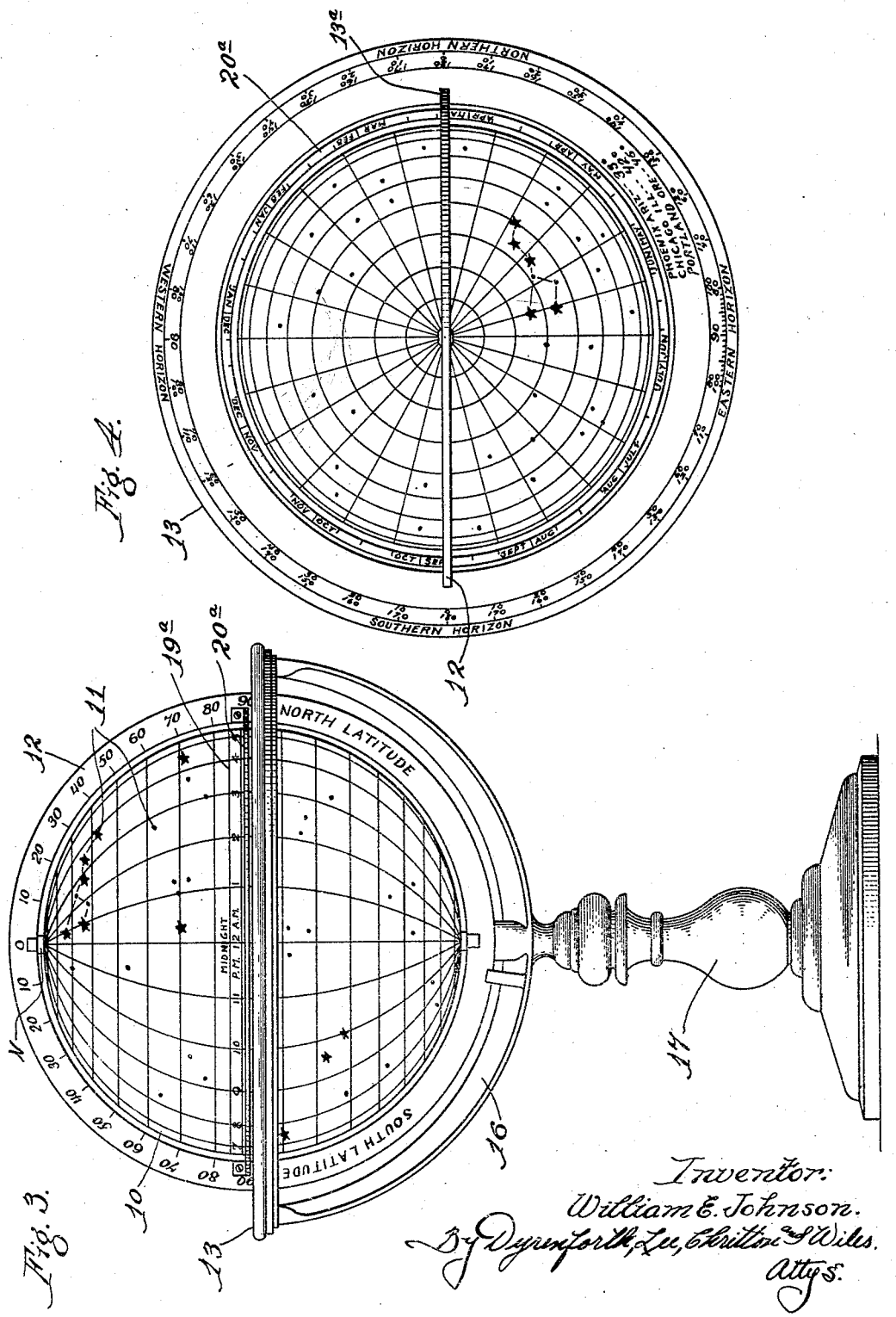

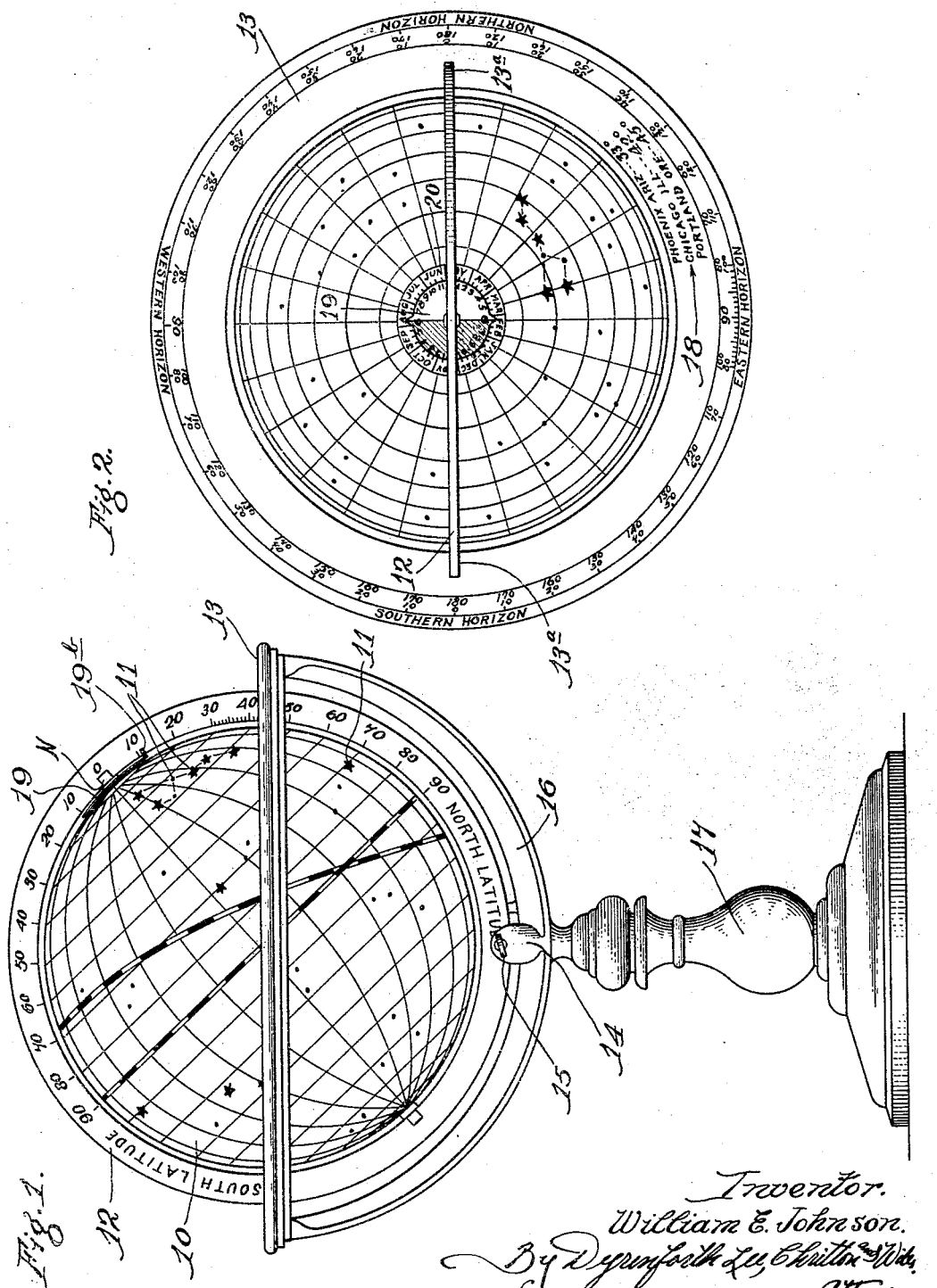

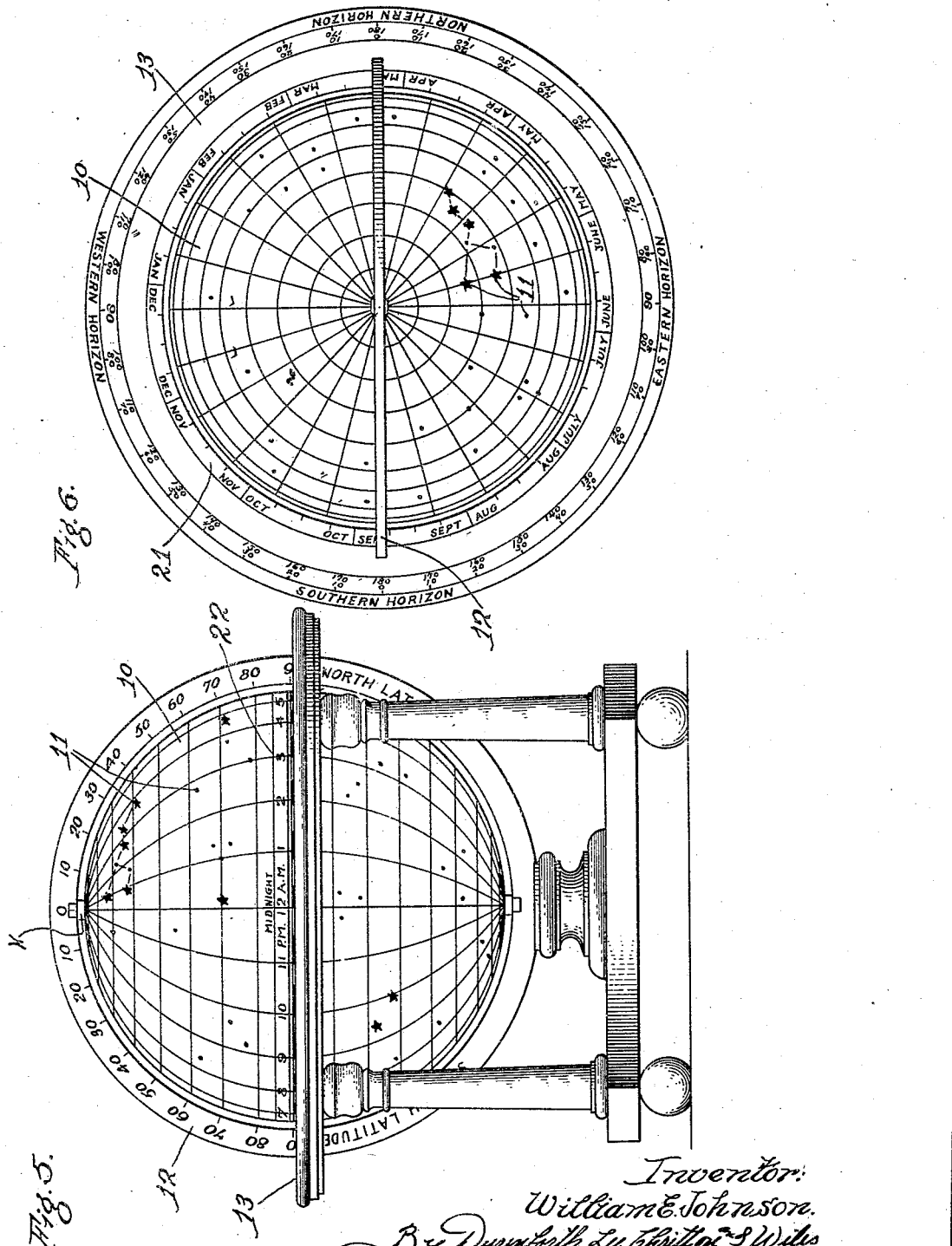

Patented Apr. 12, 1932

1,853,059

UNITED STATES PATENT OFFICE

WILLIAM E. JOHNSON, OF CHICAGO, ILLINOIS, ASSIGNOR TO RAND McNALLY & COMPANY, OF CHICAGO, ILLINOIS, A CORPORATION OF ILLINOIS

CELESTIAL GLOBE

Application filed June 3, 1931. Serial No. 541,893.

This invention relates to improvements in celestial globes and, more especially, such a globe and mounting therefor adapted for use as a star finder.

Among the features of my invention is the provision of an educational device for rectifying a celestial globe so that the stars represented thereon may be quickly and easily correlated with the corresponding stars in the heavens, for any time and place. That is, the stars on the globe will face or point to the corresponding stars in the sky and a view of the globe will enable an observer to locate and identify the stars and constellations to be seen in the heavens.

I shall not attempt to enumerate and point out all the multitude of uses that may be made of the device. It will be seen, however, that its construction and operation are extremely simple, enabling a user to set the globe quickly in its proper position.

Among the features of my invention is the provision of a meridian ring in combination with an horizon ring for orienting the axis of the globe with the axis of the earth at any latitude. Another feature is the provision of a date scale and an hour scale in combination with the globe, in such a manner that when any date and hour are brought together in the proper way, the stars represented on the globe will be correlated with the corresponding stars in the heavens as they will appear on that hour and date, it being assumed that the axis of the globe is properly adjusted.

Other features and advantages of my invention will appear more fully as I proceed with my specification.

In those forms of devices embodying the features of my invention shown in the accompanying drawings—

Figure 1 is a view in side elevation; Fig. 2 is a top plan view; Figs. 3 and 4 are similar views showing a modified form; and Figs. 5 and 6 are similar views showing another modified form.

I shall first describe the form of device shown in Figs. 1 and 2. As here shown, the celestial globe is indicated by 10 and contains thereon representations of the stars, as indicated by 11, 11. The globe 10 is rotatably mounted by the extremities of its celestial polar axis in the meridian ring 12. Numeral 13 indicates an horizon ring provided with notches 13ª, 13ª at the north and south horizons, in which the meridian ring 12 is rotatably mounted. At its lowest point, the meridian ring 12 may rest in a suitable support 14 provided with a holding screw 15 to retain the meridian ring in any desired position. The support 14 may be carried by a semi-circular member 16 mounted on a suitable standard or support 17 and carrying the horizon ring 13 at its upper ends.

The meridian ring 12 is provided with two 90° inverted latitude scales with zero degrees at the north polar axis, indicated by "N". The two scales occupy adjacent quadrants and are divided into 90° each way from the common zero point at the North pole so that the two 90° marks are separated by 180°. One scale is used for north latitude settings and is so marked, and the other scale is used for south latitude settings and is similarly marked.

This arrangement of the inverted latitude scales on the meridian ring has several distinct advantages. It permits both north and south latitude settings at one point on the horizon ring, namely, the north horizon, thus avoiding confusion that otherwise might arise from making north latitude settings at one point and south latitude settings at another.

This arrangement also prevents confusion between the north latitude and south latitude scales as frequently happens when they are both on the same side of the axis with 90° as the common mark. The arrangement disclosed also permits the placing of the words "North latitude" close to one 90° mark and "South latitude" close to the other 90° mark, thus identifying the quadrant to be used for north latitude settings and that to be used for south latitude settings, and also assisting in checking the correct assembling of the globe, since when the meridian ring is placed vertically in the horizon ring with the words "North latitude" placed adjacent the north horizon marking, these two parts are in proper arrangement for correct functioning of the globe.

For north latitude settings, the north celestial pole is elevated above the north horizon of a given place the same number of degrees that the place is north of the equator, that is, the number of degrees corresponding exactly to the north latitude of the place. For south latitude settings the north celestial pole is depressed below the northern horizon the same number of degrees that the place is south of the equator, that is, the number of degrees corresponding exactly to the south latitude of the place. (Thus, the south celestial pole is elevated above the southern horizon for places in south latitude). By the use of the inverted latitude scales arranged in the manner heretofore described, therefore, the degrees of latitude may be used directly for setting the meridian. If these latitude scales were not inverted, it would be necessary to subtract the latitude from 90° to get the required value for setting the meridian ring.

The meridian ring containing the globe is inserted vertically in the horizon ring, which is notched to receive it, as above described. The meridian ring rests upon the support 14 and is so arranged that one-half or 180° of the meridian ring is above the upper level of the horizon ring. As shown, the graduated portion is above the horizon ring with the marking "north latitude" on the meridian ring adjacent the marking "Northern horizon" on the horizon ring.

The horizon ring is supported in a horizontal position, as above described, and is marked at 90° intervals to represent the cardinal points of the horizon, which are accordingly labeled "Northern horizon", "Eastern horizon", "Southern horizon" and "Western horizon". With the horizon ring thus marked with the cardinal points, it may be oriented with the corresponding cardinal points on the observer's horizon, thereby orienting the axis of the celestial globe with the axis of the earth.

The upper surface of the horizon ring may contain the names of cities with their latitudes, as indicated by 18.

For the purpose of illustration, I have shown the globe in Fig. 1 as set for use at Chicago, Illinois. This place is substantially 42° north latitude and it will be seen that the globe is inclined so that 42° on the north latitude scale is substantially on a level with the horizon ring at the northern horizon.

I shall now describe the date scale and hour scale. These are provided in combination with the globe in such a manner that when any date and hour are brought together, the stars will be correlated with the corresponding stars in the heavens as they will appear at that hour and date, assuming the axis of the globe to be properly adjusted.

Either the date or the hour scale may be fixed with reference to the meridian ring or the horizon ring, and the other scale attached to the sphere and free to rotate therewith. These two scales may be attached near either or both polar extremities, near the equatorial regions, or in any intermediate positions that may be convenient or desirable.

In the form of device illustrated in Figs. 1 and 2, the date and hour scales are attached at the north polar extremity, the hour scale, as indicated by 19, being fixed with reference to the meridian ring by means of lugs 19ᵇ on either side thereof, or other suitable device, and the date scale, as indicated by 20, being attached to the globe so that it will rotate therewith.

In the form of device shown in Figs. 3 and 4, the sequence of dates and hours is reversed and the date scale, as indicated by 20ᵃ, is fixed with reference to the meridian ring and the hour scale, as indicated by 19ᵃ, is attached to the globe so that it will rotate therewith. As shown in this form, the date scale is shown on a ring which is attached to the meridian ring 12. The hour scale, as indicated by 19ᵃ, lies substantially on the equatorial ring of the globe. It is obvious that these scales may be reversed in sequence of dates and hours and in such case, the hour scale would be placed on the stationary ring 20ᵃ, and the date scale on the equatorial ring of the globe.

In that form of device shown in Figs. 5 and 6, the fixed scale 21 is attached to the horizon ring 13. Such fixed scale is here shown as being a date scale, although the hour scale could be fixed, if desired. When only one fixed scale is thus used at the horizon ring, the sphere must be adjusted for the correct date and hour, while the axis is in a vertical position, and the adjustment for latitude made afterwards. It is to be understood that where one scale is fixed on the horizon ring, as shown in Fig. 6, the other scale is located on the equatorial ring of the globe. For example, in the device shown in Figs. 5 and 6, where the date scale is fixed on the horizon ring, as indicated by 21, the hour scale would be on the equatorial ring of the globe, as indicated by 22.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A celestial globe of the character referred to and mounting therefor including, an horizon ring, a meridian ring rotatably mounted in the horizon ring, and two 90° inverted latitude scales on the meridian ring extending from the North Polar axis in opposite directions to the equatorial ring, said scale adjacent the northern horizon being indicated as the north latitude scale and the other scale as the south latitude scale.

2. A celestial globe of the character referred to and mounting therefor including an horizon ring, a meridian ring rotatably mounted in the horizon ring, the globe being rotatably carried in said meridian ring, and hour and date scales cencentric with respect to the axis of the globe, one being fixed with respect to the globe mounting and the other rotatable with the globe.

3. A celestial globe; a mounting for the globe in which the same is rotatably supported; and co-operating hour and date scales concentric with respect to the axis of the globe, one being fixed with respect to the globe mounting and the other rotatable with the globe.

4. Apparatus as claimed in claim 3, in which the hour and date scales are located adjacent a polar axis.

5. Apparatus as claimed in claim 3, in which the hour and date scales are located adjacent the horizon.

In witness whereof I have hereunto set my hand this 1st day of June, 1931.

WILLIAM E. JOHNSON.